(12) United States Patent
Andersen

(10) Patent No.: US 8,429,601 B2
(45) Date of Patent: Apr. 23, 2013

(54) CODE COMPLETION FOR OBJECT RELATIONAL MAPPING QUERY LANGUAGE (OQL) QUERIES

(75) Inventor: Max Rydahl Andersen, Neuchatel (CH)

(73) Assignee: Red Hat, Inc., Raleigh, NC (US)

( * ) Notice: Subject to any disclaimer, the term of this patent is extended or adjusted under 35 U.S.C. 154(b) by 1093 days.

(21) Appl. No.: 11/947,711

(22) Filed: Nov. 29, 2007

(65) Prior Publication Data
US 2009/0144696 A1 Jun. 4, 2009

(51) Int. Cl.
*G06F 9/44* (2006.01)
(52) U.S. Cl.
USPC ............................ 717/109; 717/113; 717/126
(58) Field of Classification Search ........................ None
See application file for complete search history.

(56) References Cited

U.S. PATENT DOCUMENTS

| | | | |
|---|---|---|---|
| 6,430,556 B1 * | 8/2002 | Goldberg et al. | 717/109 |
| 6,795,825 B2 * | 9/2004 | Rishe | 1/1 |
| 8,141,036 B2 * | 3/2012 | Wagner et al. | 717/113 |
| 2003/0126152 A1 * | 7/2003 | Rajak | 707/101 |
| 2007/0011651 A1 * | 1/2007 | Wagner | 717/110 |
| 2007/0027905 A1 * | 2/2007 | Warren et al. | 707/103 R |
| 2007/0219976 A1 * | 9/2007 | Muralidhar et al. | 707/4 |
| 2007/0226196 A1 * | 9/2007 | Adya et al. | 707/3 |
| 2008/0189311 A1 * | 8/2008 | Cote et al. | 707/101 |
| 2008/0244510 A1 * | 10/2008 | Cote | 717/108 |
| 2008/0270980 A1 * | 10/2008 | Ahadian et al. | 717/109 |
| 2008/0270983 A1 * | 10/2008 | Ahadian et al. | 717/113 |
| 2008/0270989 A1 * | 10/2008 | Ahadian et al. | 717/126 |
| 2009/0063436 A1 * | 3/2009 | Ebersole | 707/4 |
| 2009/0144696 A1 * | 6/2009 | Andersen | 717/109 |
| 2009/0313298 A1 * | 12/2009 | Koyanagi et al. | 707/103 R |
| 2010/0114962 A1 * | 5/2010 | Ahadian et al. | 707/782 |
| 2010/0293524 A1 * | 11/2010 | Ahadian et al. | 717/109 |
| 2011/0040852 A1 * | 2/2011 | Sakhare | 717/126 |

OTHER PUBLICATIONS

Zhang et al., "The Real Benefits of Object-Relational DB-Technology for Object-Oriented Software Development", Jul. 2001, Springer, BNCOD 2001, pp. 1-17; <http://pdf.aminer.org/000/068/085/the_real_benefits_of_object_relational_db_technology_for_object.pdf>.*
Xia et al., "Efficient implement of ORM (Object/Relational Mapping) use in J2EE framework: Hibernate", 2009 IEEE, pp. 1-3; <http://ieeexplore.ieee.org/stamp/stamp.jsp?tp=&arnumber=5365905>.*
Kowark et al., "Object-Relational Mapping with SqueakSave", Aug. 2008, ACM, pp. 87-100; <http://dl.acm.org/citation.cfm?id=1735935.1735951&coll=DL&dl=GUIDE&CFID=156265428&CFTOKEN=91474729>.*
Ashley J.S. Mills, "ANTLR", copyright 2005, The University of Birmingham, 32pp.
Alberto Montresor, et al., "Jgroup Tutorial and Programmer's Manual", Feb. 2002, 53pp.
"PojoCache", User Documentation, Release 1.4.1 "Cayenne", 38pp.

(Continued)

*Primary Examiner* — Thuy Dao
*Assistant Examiner* — Ben C Wang
(74) *Attorney, Agent, or Firm* — Lowenstein Sandler LLP

(57) ABSTRACT

Techniques for developing database applications are described herein. According to one embodiment, an object-relational mapping (ORM) query language (OQL) statement is received via a first window which is entered from a user for querying an underlying database, where the OQL statement is written in a customized query language that is incompatible with the underlying database. In response, a SQL statement compatible with the underlying database is dynamically displayed in a second window, where the SQL statement is automatically translated from the OQL statement displayed in the first window. Other methods and apparatuses are also described.

22 Claims, 21 Drawing Sheets

OTHER PUBLICATIONS

ManikSurtani, et al., "JBoss Cache User Guide", A clustered, transactional cache, Release 2.0.0 Habanero, Jun. 2007, Copyright © 2004, 2005, 2006, 2007 JBoss, a division of Red Hat Inc., 92pp.
"Hibernate Tools", Reference Guide, Version: 3.2.0.beta9, 49pp.
"Hibernate Shards", Horizontal Partitioning with Hibernate, Version: 3.0.0.Beta1, 20pp.
"Hibernate Search", Apache Lucene Integration, Version: 3.0.0.Beta1, 22pp.
Hibernate Reference Documentation, Version: 3.2.2, 229pp.
Hibernate EntityManager, User Guide, Version 3.3.0.GA, 52pp.
Hibernate Annotations, Reference Guide, Version 3.3.0.GA, 58pp.

* cited by examiner

CODE COMPLETION FOR OBJECT RELATIONAL MAPPING QUERY LANGUAGE (OQL) QUERIES

TECHNICAL FIELD

The present invention relates generally to object relational mapping in database management. More particularly, this invention relates to graphical user interfaces for code completion.

BACKGROUND

Data management tasks in object-oriented programming are typically implemented by manipulating objects, which are typically non-scalar values. Consider the example of an address book entry, which represents a single person along with zero or more phone numbers and zero or more addresses. This could be modeled in an object-oriented implementation by a "person object" with "slots" to hold the data that comprise the entry: the person's name, a list (or array) of phone numbers, and a list of addresses. The list of phone numbers would itself contain "phone number objects" and so on. The address book entry is treated as a single value by the programming language (it can be referenced by a single variable, for instance). Various methods can be associated with the object, such as a method to return the preferred phone number, the home address, and so on.

Many popular database products, however, such as SQL DBMS products, can only store and manipulate scalar values such as integers and strings, organized within tables. A programmer must either convert the object values into groups of simpler values for storage in the database (and convert them back upon retrieval), or only use simple scalar values within the program. Object-relational mapping is used to implement the first approach. Object-relational mapping (aka O/RM, ORM, and O/R mapping) is a programming technique for converting data between incompatible type systems in databases and object-oriented programming languages. This creates, in effect, a "virtual object database" which can be used from within the programming language.

In the JAVA programming environment, typically, a user utilizes a JAVA editor to edit JAVA query strings. For certain non-JAVA programming languages, a specialized editor is used. However, there has been a lack of integration user interfaces between a standardized JAVA editor and a customized editor that provides a user instant presentation of object-relational mapping (ORM).

BRIEF DESCRIPTION OF THE DRAWINGS

The present invention is illustrated by way of example and not limitation in the figures of the accompanying drawings in which like references indicate similar elements.

FIGS. 6A-6F illustrate a GUI of an IDE for developing database applications according to another embodiment of the invention.

FIGS. 8A-8B illustrate a GUI of an IDE for developing database applications according to a further embodiment of the invention.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
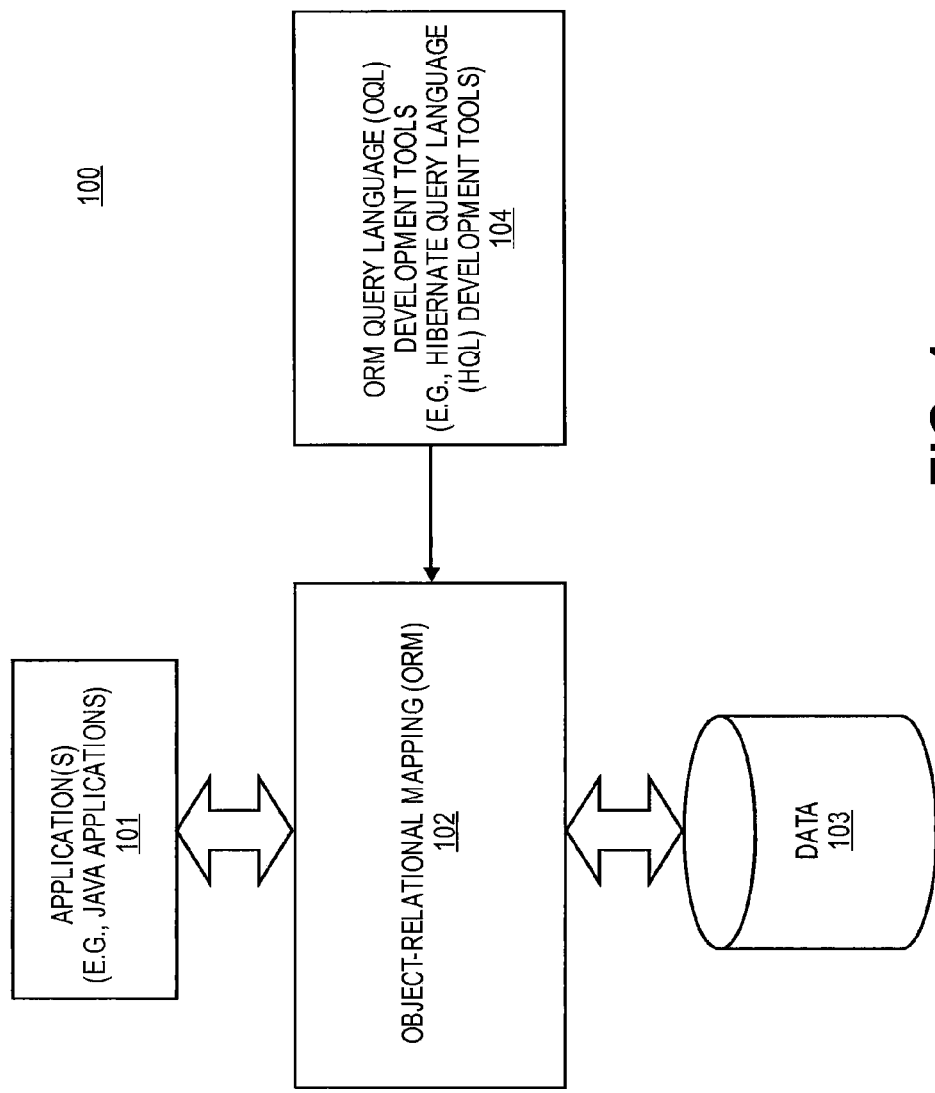
FIG. 1 is a block diagram illustrating an application framework which may be used with one embodiment of the invention.

FIG. 1 is a block diagram illustrating an application framework which may be used with one embodiment of the invention. Referring to FIG. 1, framework 100 includes, but is not limited to, an application client 101 accessing a database or data store 103 through a common query API (application programming interface) 102 with object-relational mapping (ORM) features, also referred to as an ORM module or ORM system. The API 102 provides the ability to map an object model's data representation to a relational data model and its corresponding database schema. For example, in a JAVA computing environment, the API 102 takes care of the mapping from JAVA classes to database tables and from JAVA data types to SQL (structured query language) data types used in a database. Note that throughout this application and for the purposes of illustration only, JAVA is used as an example of a cross-platform programming language. However, it is not so limited; other cross-platform programming languages, such as .NET®, etc., may also be applied. The API 102 provides data query and retrieval facilities that reduce development time, which is designed to relieve a software developer from most of common data persistence-related programming tasks by reducing the need for manual, hand-crafted data processing using SQL and JDBC (JAVA database connectivity). The JDBC API is the industry standard for database-independent connectivity between the JAVA programming language and a wide range of databases—SQL databases and other tabular data sources, such as spreadsheets or flat files.

Figure 3:
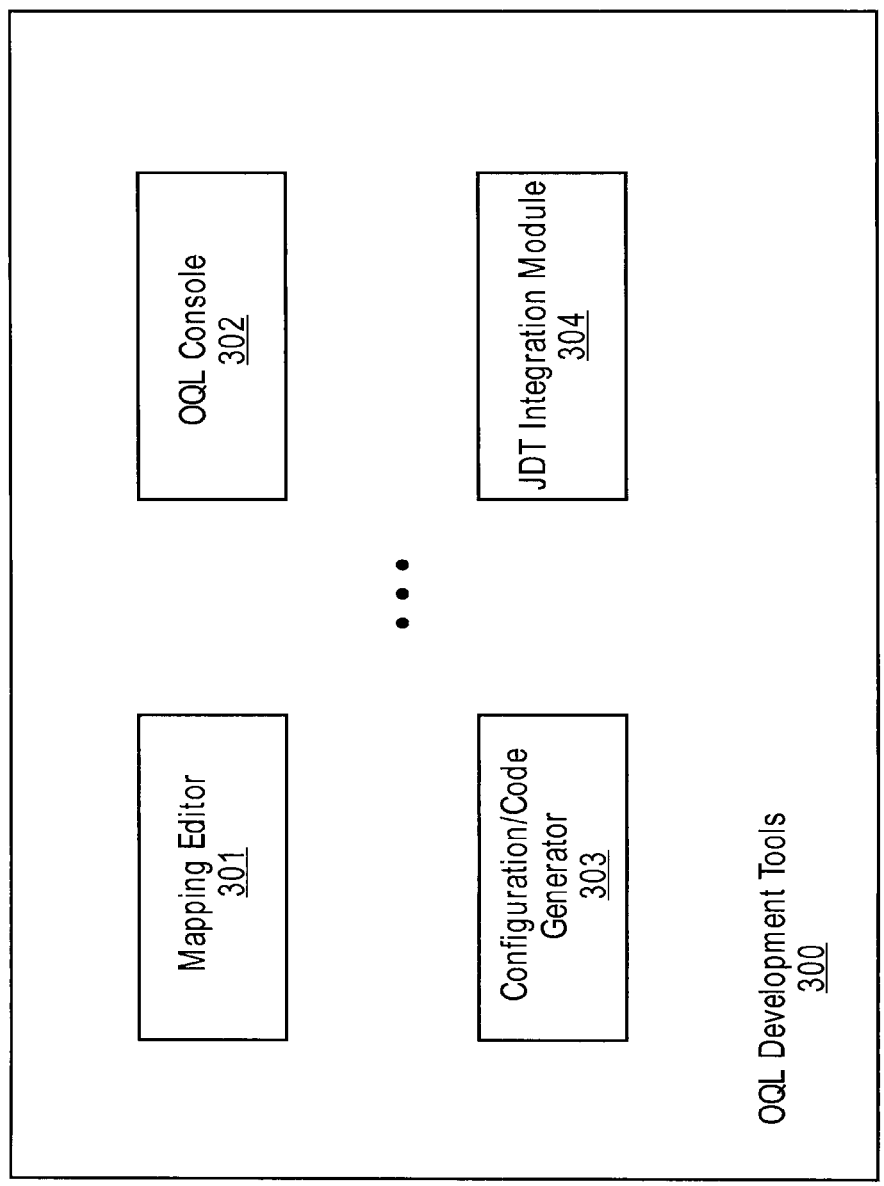
FIG. 3 is a block diagram illustrating an example of SQL development tools according to one embodiment of the invention.

According to one embodiment, the ORM 102 may be developed using ORM query language (OQL) development tools 104. The OQL development tools 104 include a variety of features that support both standard SQL programming languages such as JAVA and customized SQL programming language, including other OQL such as Hibernate query language (HQL). The OQL development tools 104 further provide an integrated graphical user interface (GUI) to enable interactive communications between the standardized SQL programming environment and the customized SQL programming environment. The OQL development tools 104 further provide instant code completion and error checking for editing SQL strings to enable a user to easily generate query strings. OQL development tools 104 will be described in details further below. Note that some or all of the components as shown in FIGS. 1 and 3 may be implemented in software, hardware, or a combination of both. Other configurations may also exist.

Figure 2:
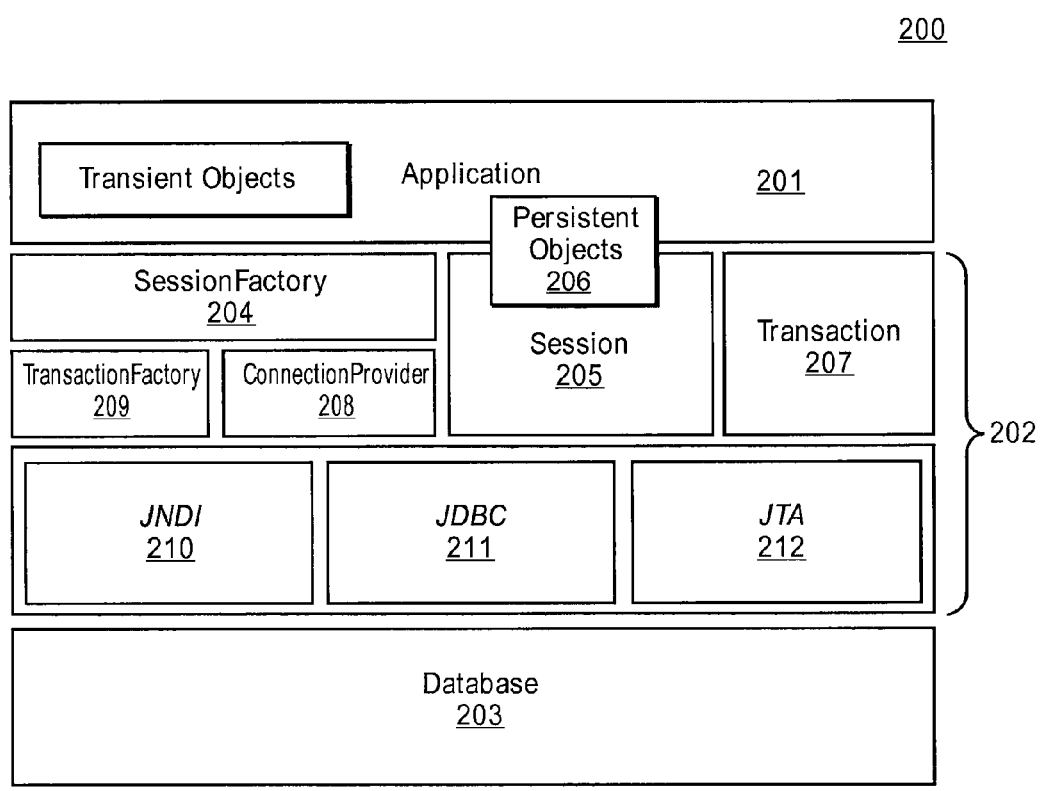
FIG. 2 is a block diagram illustrating an application framework according to an alternative embodiment of the invention.

FIG. 2 is a block diagram illustrating an application framework according to an alternative embodiment of the invention. Referring to FIG. 2, similar to framework 100 as shown in FIG. 1, framework 200 includes, but is not limited to, an application 201 accessing database 203 via an application framework 202 which may be implemented as part of framework 102 of FIG. 1. In this example, framework 202 is configured to provide persistent services to application 201.

Framework 202 includes a variety of components. For example, session factory 204 is configured to provide a thread-safe (immutable) cache of compiled mappings for a single database. Session factory 204 is a factory for session 205 and a client of connection provider 208 and it may hold an optional (e.g., second-level) cache of data that is reusable between transactions, at a process- or cluster-level. Session 205 is a single-threaded, short-lived object representing a conversation between the application 201 and the persistent store 203. Session 205 wraps a JDBC connection and is a factory for transaction 207. Session 205 holds a mandatory (first-level) cache of persistent objects, which are used when navigating an object graph or looking up objects based on an identifier.

Persistent objects 206 are short-lived, single threaded objects containing persistent state and business function. Persistent objects 206 may be, for example, ordinary JAVA-Beans/POJOs (plain old JAVA objects). Persistent objects 206 may be associated with a session (e.g., session 205). As soon as the associated session is closed, the persistent objects 206 may be detached and free to use in any application layer (e.g. directly as data transfer objects to and from presentation). Transaction 207 is a single-threaded, short-lived object used by the application to specify atomic units of work. Transaction 207 abstract applications from underlying JDBC (JAVA database connectivity), JTA (JAVA transaction API), and/or CORBA (common object request broker architecture) transactions. A session may span several transactions in some situations.

The JDBC API is the industry standard for database-independent connectivity between the JAVA programming language and a wide range of databases—SQL databases and other tabular data sources, such as spreadsheets or flat files. The JDBC API provides a call-level API for SQL-based database access. The JTA specifies standard JAVA interfaces between a transaction manager and the parties involved in a distributed transaction system, such as the resource manager, the application server, and the transactional applications. The CORBA is a standard defined by the Object Management Group (OMG) that enables software components written in multiple computer languages and running on multiple computers to interoperate. CORBA "wraps" program code into a bundle containing information about the capabilities of the code inside and how to call it. The resulting wrapped objects can then be called from other programs (or CORBA objects) across a network. CORBA uses an interface definition language (IDL) to specify the interfaces that objects will present to the world. CORBA then specifies a "mapping" from IDL to a specific implementation language like C++ or JAVA.

Referring back to FIG. 2, connection provider 208 is a factory for (and pool of) JDBC connections. Connection provider 208 abstracts application 201 from underlying data sources or driver managers (e.g., JNDI or JAVA naming and directory interface 210, JDBC 211, and JTA 212). Transaction factory 209 is a factory for transaction 207 instances. Framework 200 supports a variety of databases, including, for example, Oracle®, DB2®, Sybase®, MS® SQL ® server, MySQL®, etc. In one embodiment, framework 200 may be developed using SQL tools 104 of FIG. 1. Note that some or all of the components as shown in FIG. 2 may be implemented in hardware, software, or a combination of both hardware and software.

FIG. 3 is a block diagram illustrating an example of OQL development tools according to one embodiment of the invention. For example, tools 300 may be implemented as part of tools 104 of FIG. 1. Referring to FIG. 3, tools 300 include, but are not limited to, a mapping editor 301, an OQL console module 302, a configuration and code generator 303, and JAVA development tool (JDT) integration module 304. Mapping editor 301 is configured for XML mapping files, supporting auto-completion and syntax high-lighting. Mapping editor 301 also supports semantic auto-completion for class names and property/field names, making it much more versatile than a typical XML editor. Console 302 is configured to provide an overview of OQL console configurations, where a user also can get an interactive view of user's persistent classes and their relationships. Console 302 allows a user to execute customized or standard SQL queries against an underlying database and browse the result directly within the development environment.

Configuration wizards and code generator 303 are configured to allow a user to quickly generate common SQL configuration files, and from those files, a user can generate code for a series of various artifacts. Module 303 also supports reverse engineering on an existing database schema and uses the code generator to generate POJO source files and object-relational mapping files. JDT integration module is configured to integrate into JAVA code completion and build support of JAVA within the integrated development environment (IDE). This gives a user code completion of certain customized SQL or OQL (e.g., Hibernate) inside the JAVA code. In addition, the IDE would add problem markers if the queries are invalid against the console configuration associated with the project. Note that throughout this application, Hibernate query language (HQL), which is available from hibernate-.org, is utilized as an example of a customized SQL programming language. However, it is not so limited; other SQL programming languages may also be applied. Other configurations may exist.

Figure 4A:
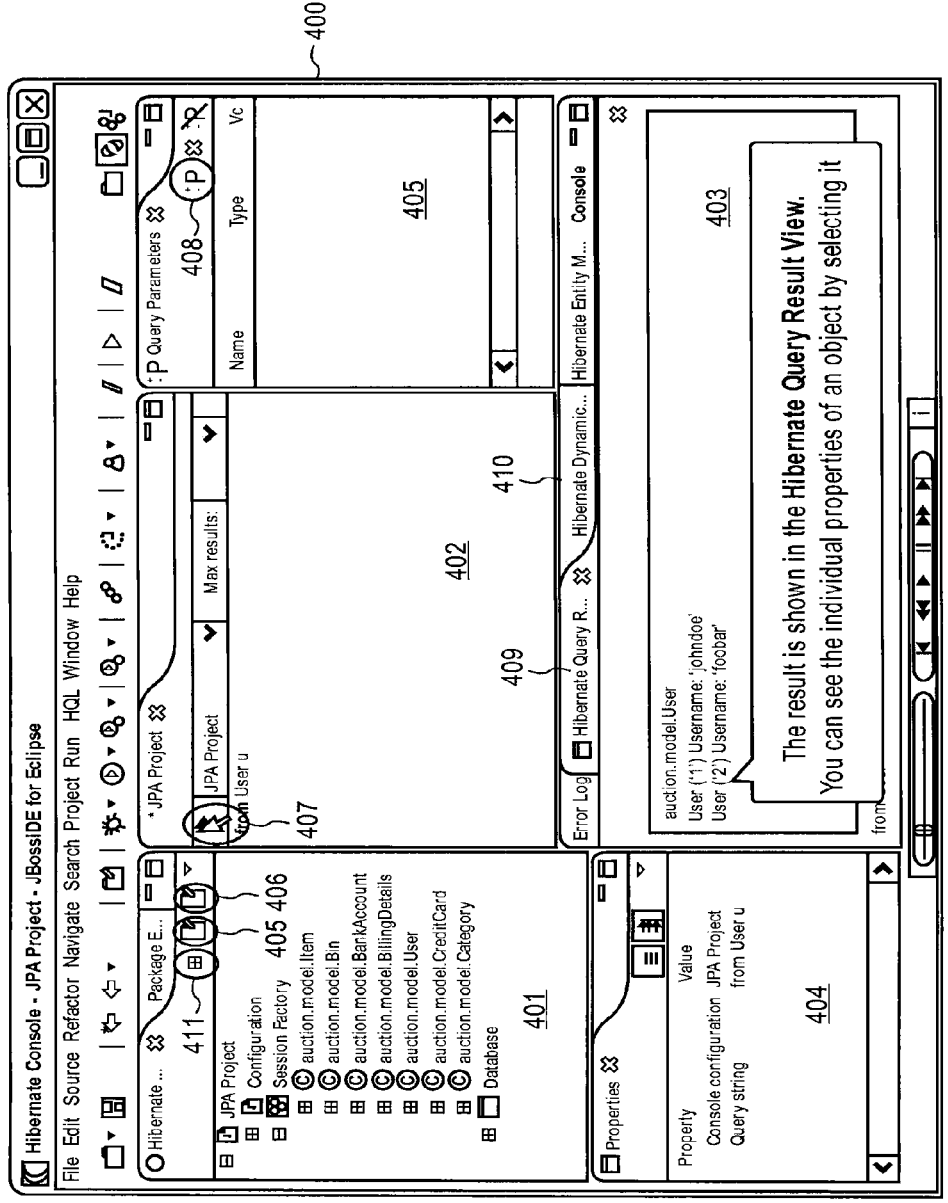
FIGS. 4A-4H illustrate a GUI of an IDE for developing database applications according to one embodiment of the invention.
Figure 4B:
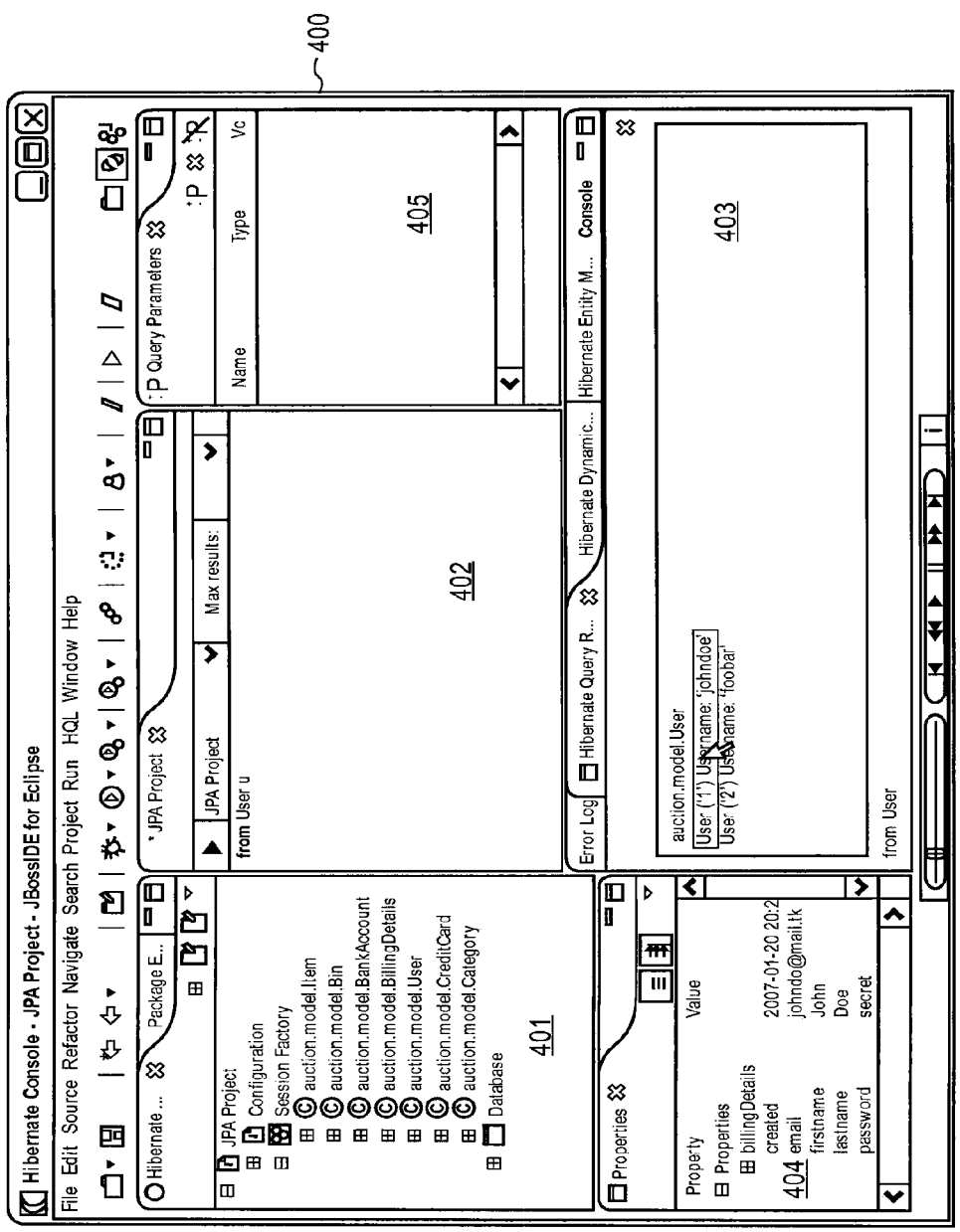
Figure 4C:
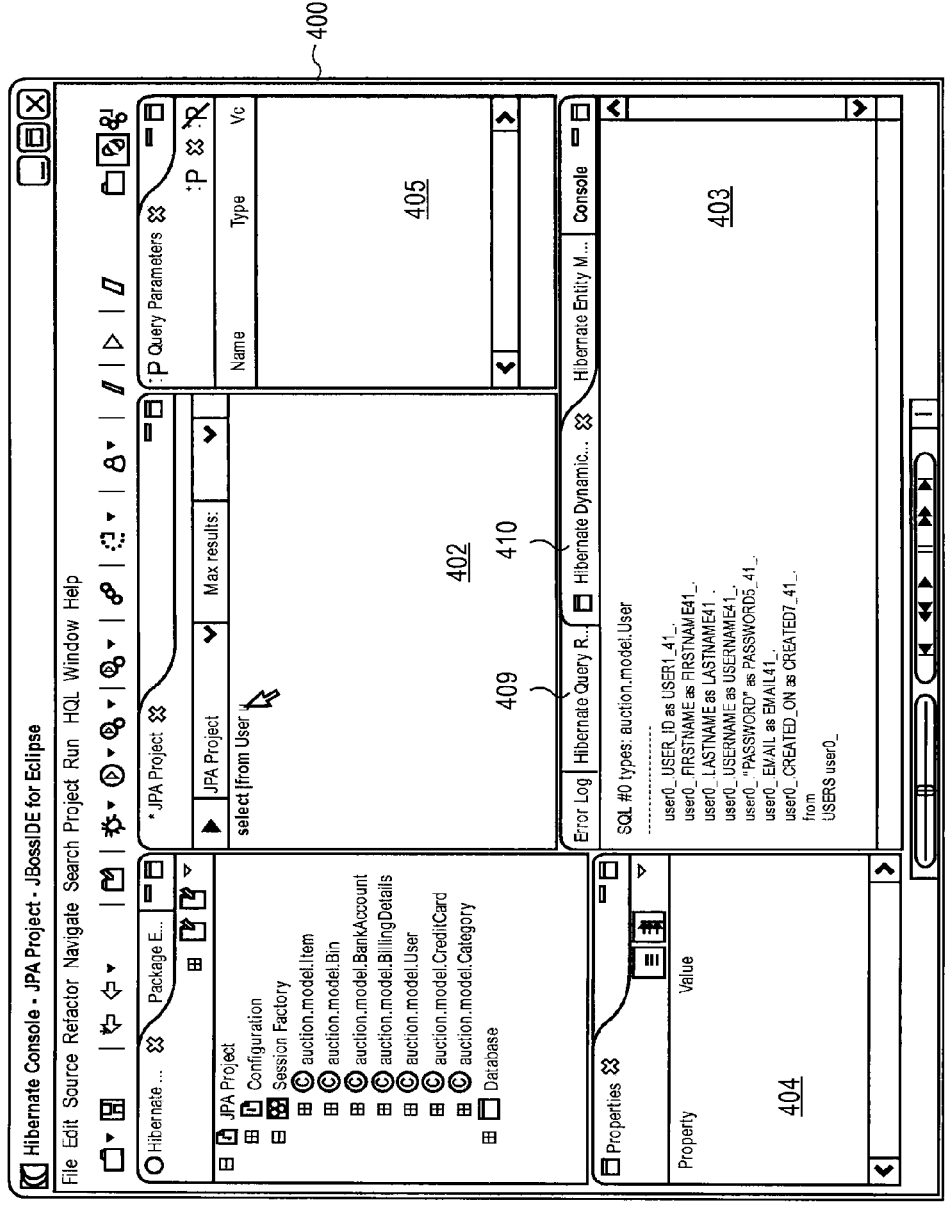
Figure 4D:
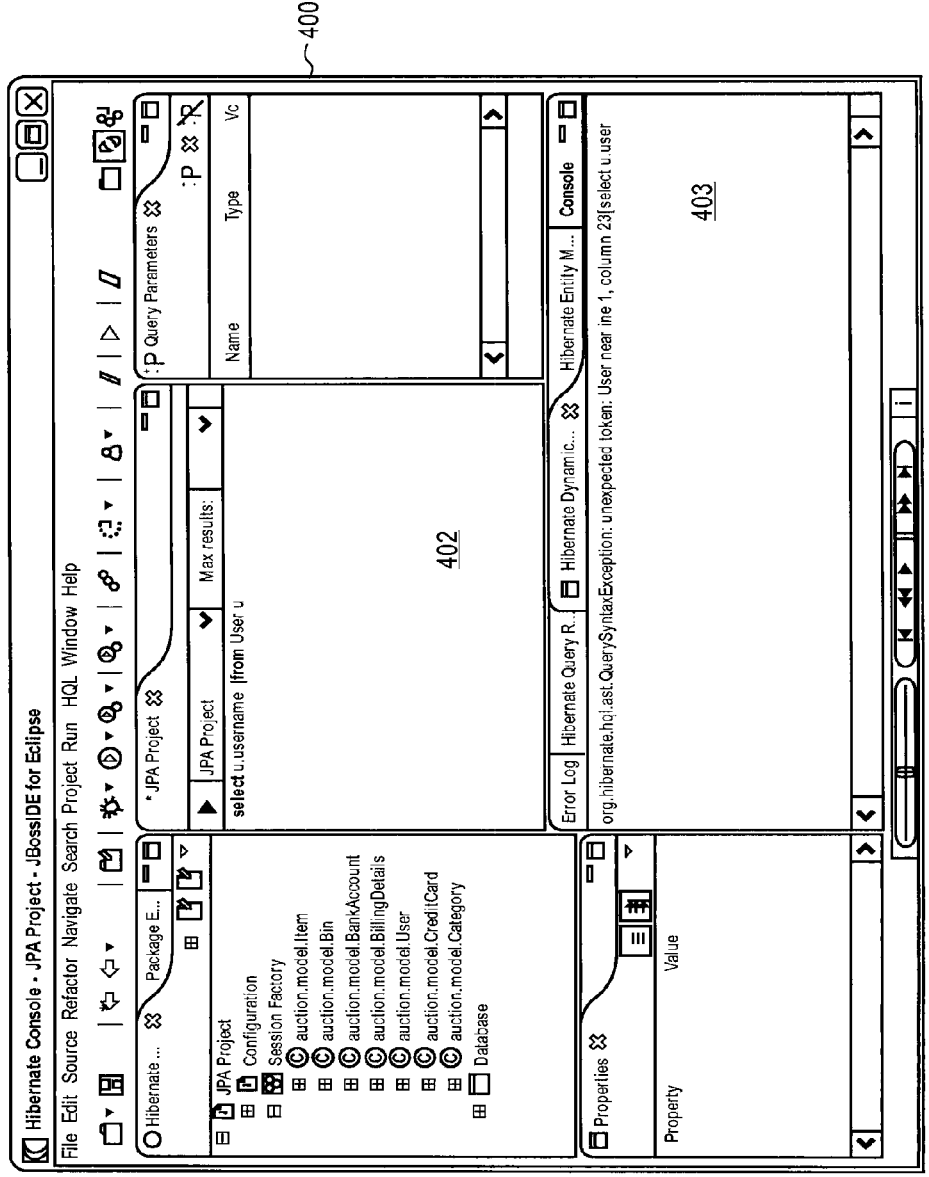
Figure 4E:
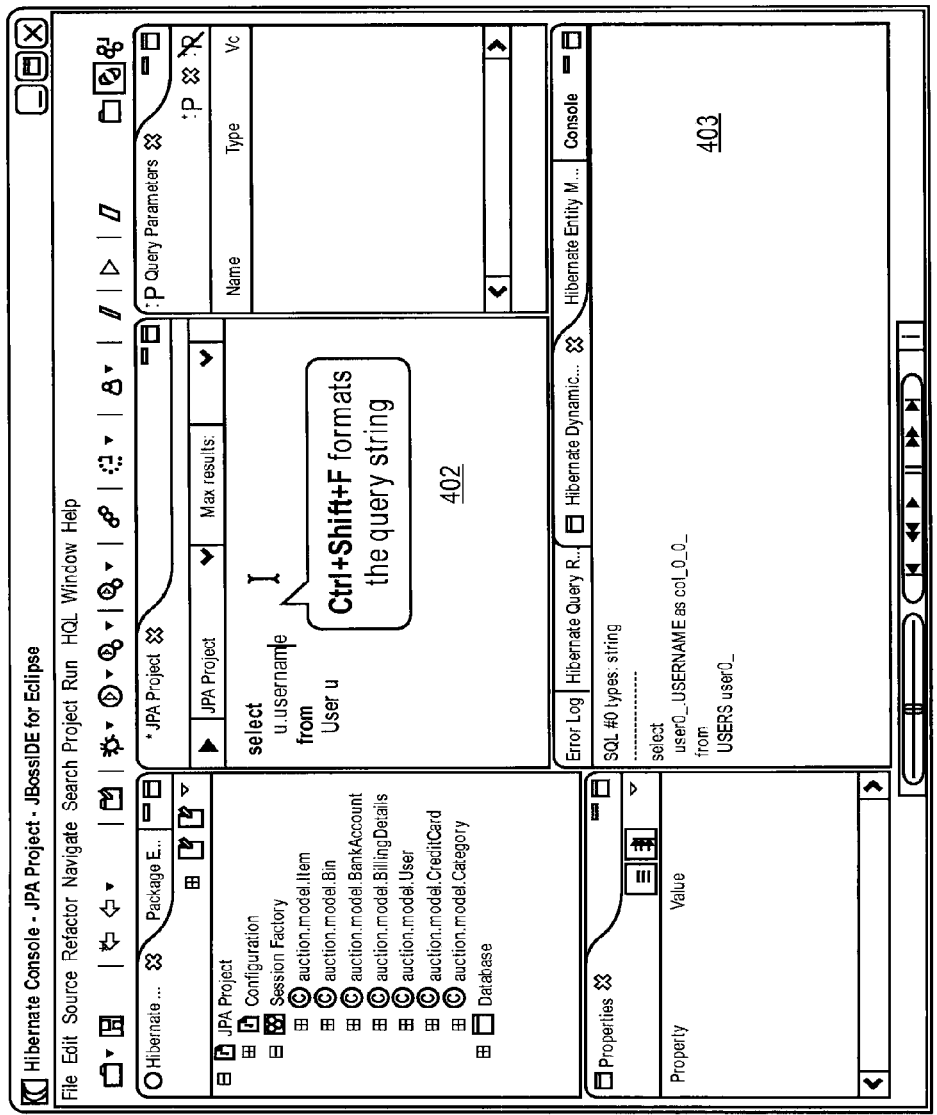
Figure 4F:
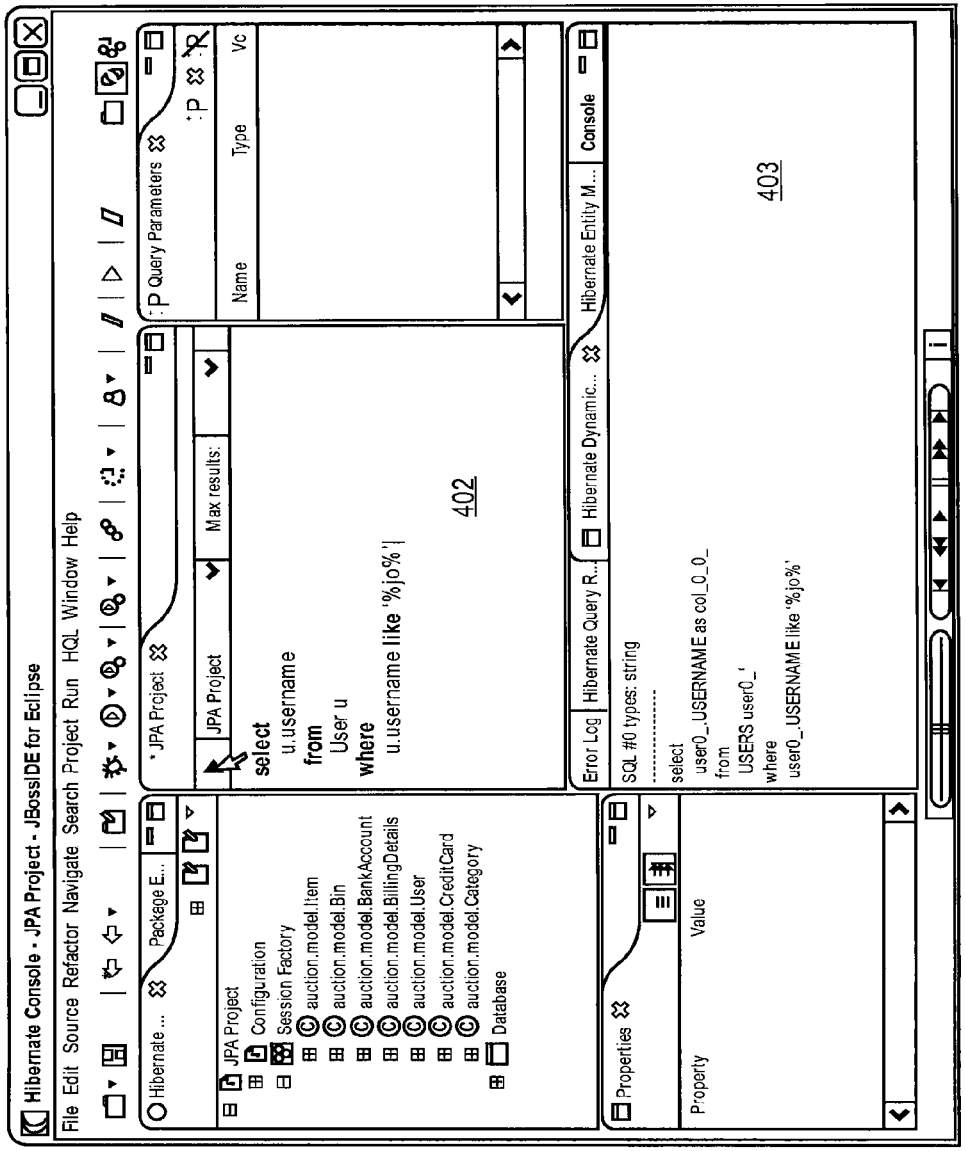
Figure 4G:
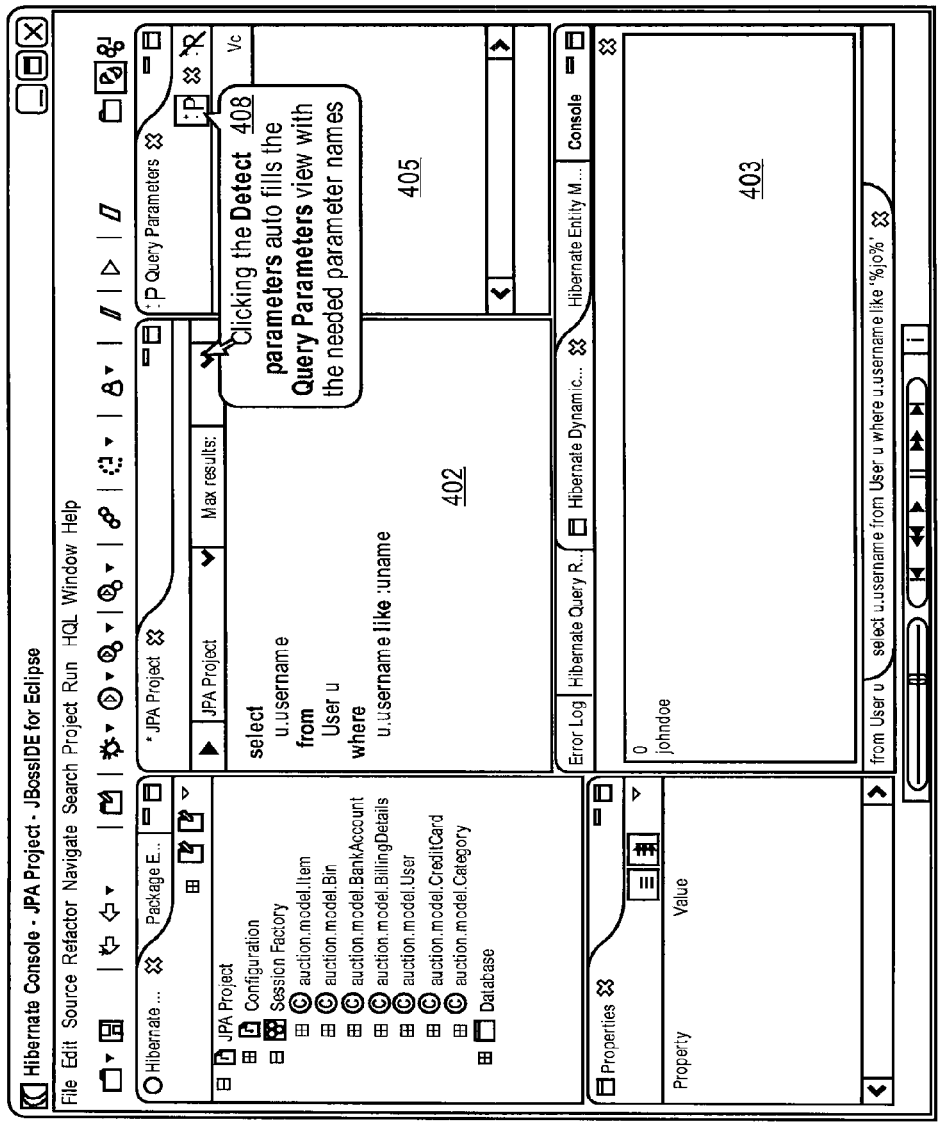
Figure 4H:
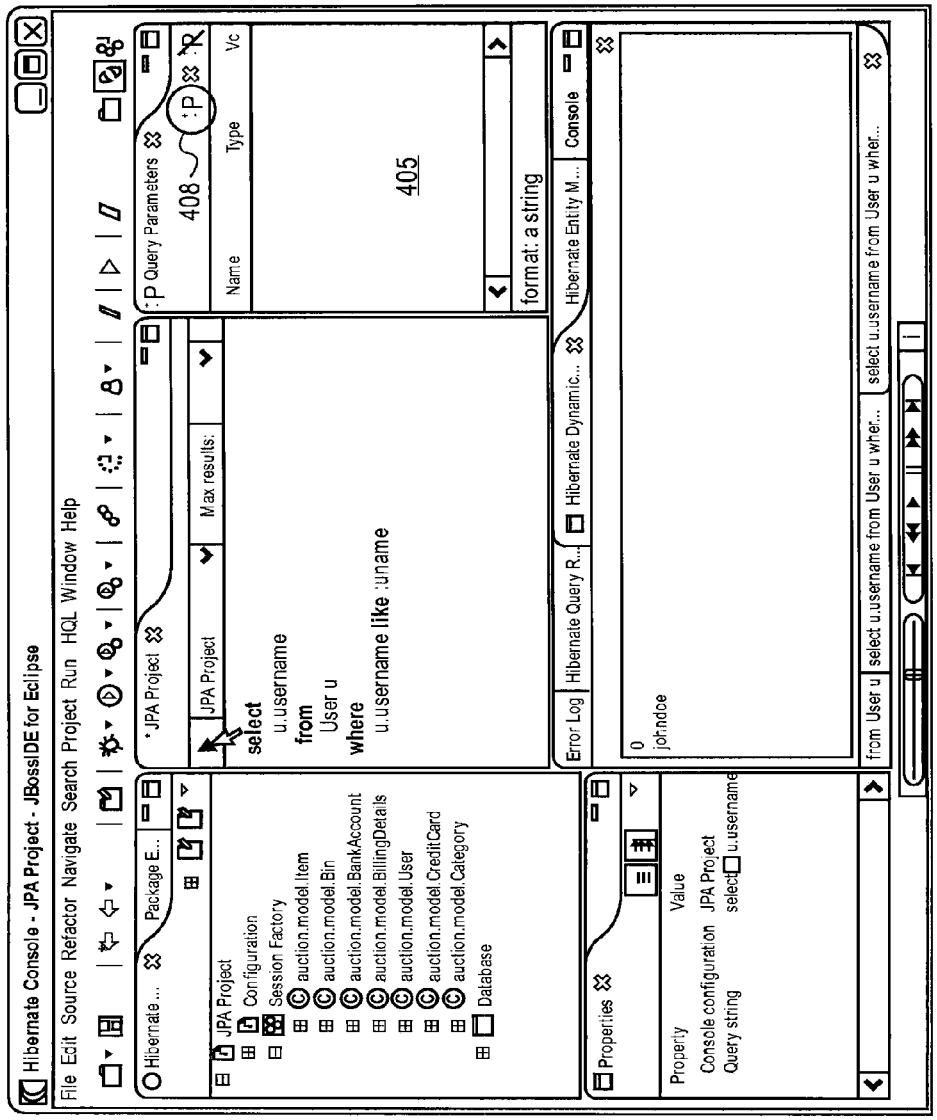

FIGS. 4A-4H illustrate a GUI of an IDE for developing database applications according to one embodiment of the invention. For example, the IDE as shown in FIGS. 4A-4H may be implemented as part of OQL console 302 in FIG. 3. Referring to FIGS. 4A4H, GUI 400 combines a set of views which allow a user to see the structure of user's mapped entities/classes, edit HQL queries, execute the queries, and see the results. To view a new configuration and entity/class structure, a user may expand the console configuration by clicking on the "+" icon 411. According to one embodiment, GUI 400 includes multiple windows to provide views of a variety of content and the relationship thereof. For example, GUI 400 includes a project window 401 for displaying content associated with a particular project, including configuration, session factory, and database sections.

GUI 400 further includes an editing window 402 for editing query strings. Editor 402 may be a HQL editor which may be activated by activating control or button 405. Alternatively, editor 402 may be a criteria editor which may be activated by activating control or button 406. Note that throughout this application, GUI 400 is demonstrated as an example of an IDE and certain tool bars or buttons displayed within the GUI are also shown for the illustration purposes only. Other forms of user interfaces, such as, pull-down or pop-up menus may also be utilized.

Referring to FIG. 4A, after a query string is entered in window 402, according to one embodiment, a user may execute the query string against an underlying database by activating button or control 407. A result of the execution may be displayed in window 403. For example, window 403 may be used to display query results by selecting an appropriate tab or page selector 409. As can be seen, window 403 may also be used to display other information dependent upon the selection of the tabs or page selectors such as tab 410.

In addition, in one embodiment, a user may further view one or more properties associated with any of the result items displayed in window 403. For example, as shown in FIG. 4B, when a user selects or highlights a result item in window 403, one or more properties associated with the selected result item are displayed in window 404. The user then may browse through the properties within window 404.

As described above, window 403 can be used to display a variety of information upon selecting proper tabs. Referring to FIG. 4C, according to one embodiment, by selecting tab 410, window 403 may be used to dynamically display SQL strings that are compatible with the underlying database. In this example, window 402 is used to edit customized HQL strings which are incompatible with the underlying database being managed. SQL strings displayed in window 403 are dynamically translated from HQL strings displayed in window 402, as part of object-relational mapping. In one embodiment, while a user is entering HQL in window 402, window 403 is concurrently displaying the translated SQL dynamically so that the user can see the translation or mapping in real time.

Further, according to another embodiment of the invention, GUI 400 also includes automatic formatting features. For example, referring to FIG. 4D, when a user enters an HQL string in 402 as a single line string, an SQL string that is translated from the HQL is dynamically displayed in window 403 as a single line string. Upon activating a control (e.g., a button or a key stroke), in this example a "Ctrl-Shift-F" key combination, the HQL strings displayed in window 402 and the SQL strings are automatically formatted to a certain format as shown in FIGS. 4E-4F.

According to a further embodiment, if a query string includes a parameter having a specific name, such a parameter can be checked and viewed within the IDE. For example, referring to FIG. 4G, in this example, a query string in window 402 includes a parameter of "uname". Such a parameter can be automatically filled in a parameter window 405 by activating a control or button 408, as shown in FIG. 4H. Again, GUI 400 as shown in FIGS. 4A-4H are described for purposes of illustration only. Other formats may also be implemented.

Figure 5:
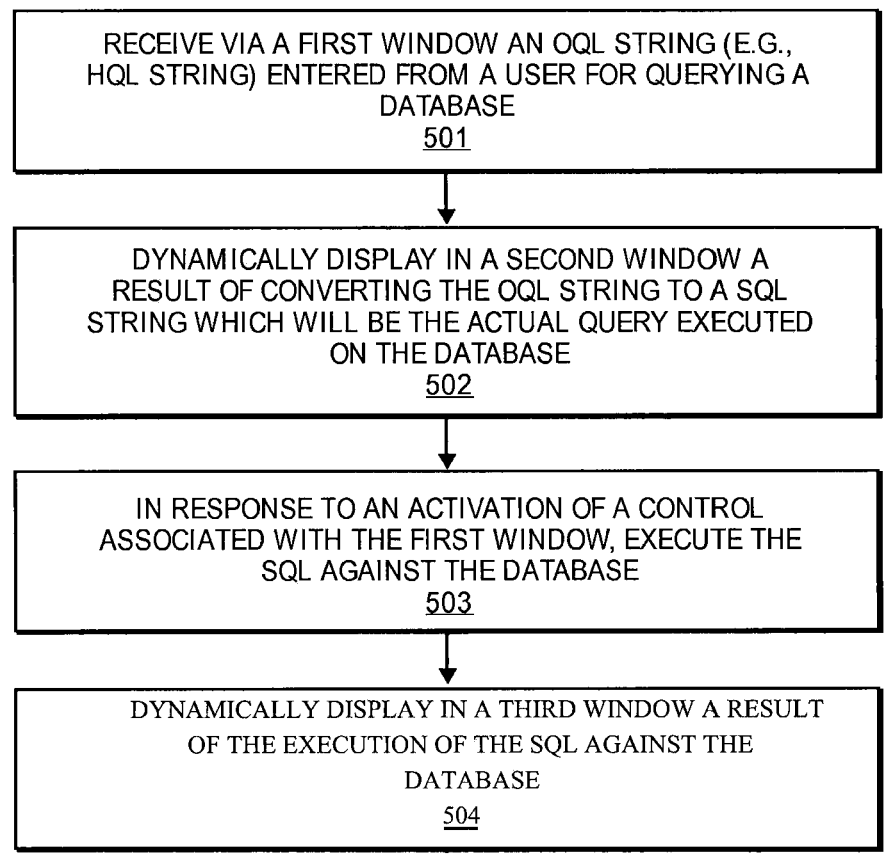
FIG. 5 is a flow diagram illustrating a process for developing database applications according to one embodiment of the invention.

FIG. 5 is a flow diagram illustrating a process for developing database applications according to one embodiment of the invention. Note that process 500 may be performed by processing logic which may include software, hardware, or a combination thereof. For example, process 500 may be performed by a system as shown in FIGS. 4A-4H. Referring to FIG. 5, at block 501, processing logic receives via a first window an OQL (e.g., a first SQL) string entered by a user for querying a database, where the OQL string is incompatible with the underlying database. At block 502, processing logic dynamically displays a SQL string (e.g., a second SQL string) in a second window that is compatible with the database, where the SQL string is dynamically translated from the OQL string. In response to a user input, at block 503, processing logic executes the SQL string against the database and at block 504, a result of the execution is displayed in a third window. Other operations may also be performed.

Figure 6A:
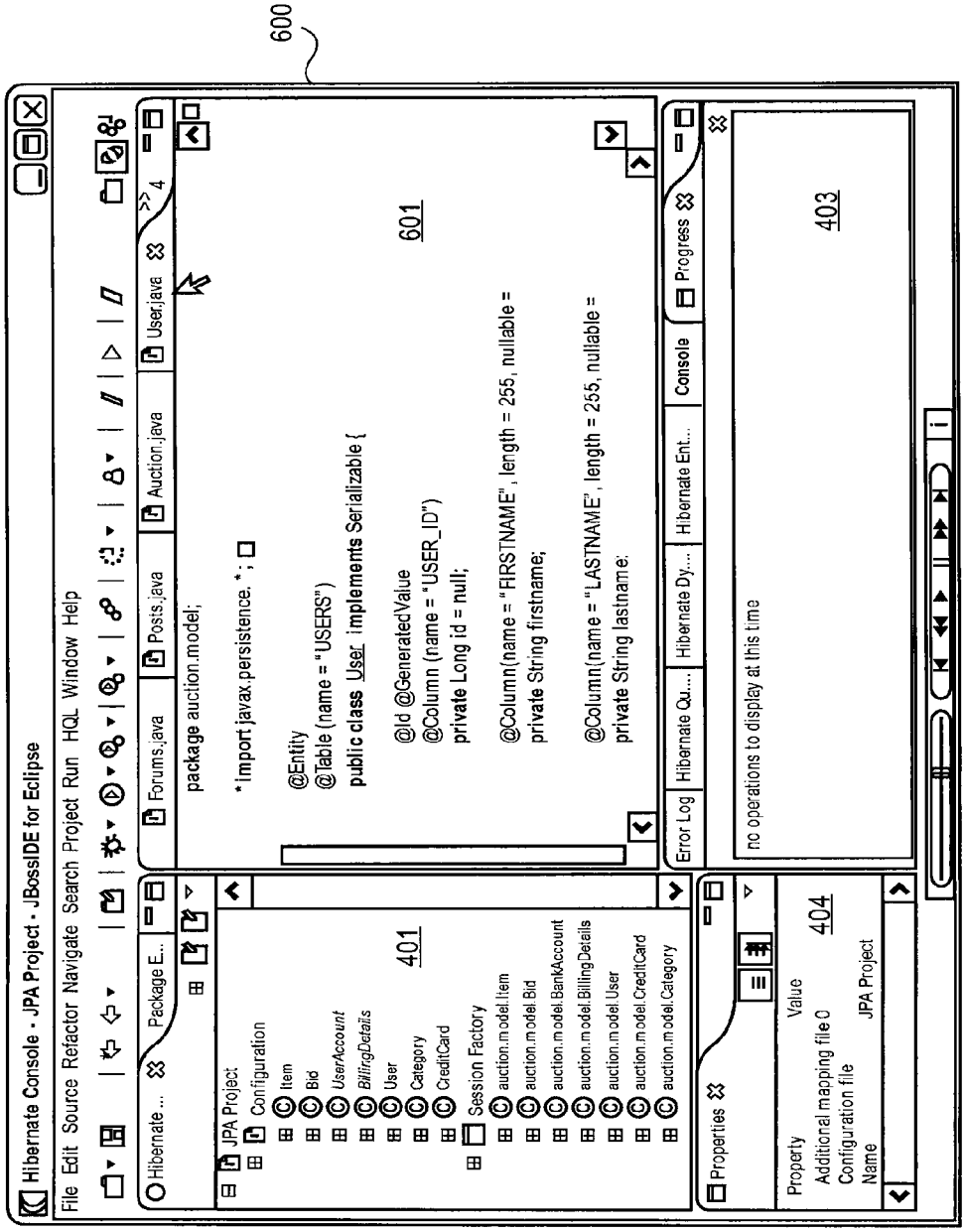

FIGS. 6A-6F illustrate a GUI of an IDE for developing database applications according to one embodiment of the invention. For example, GUI 600 may be implemented as part of GUI 400 as shown in FIGS. 4A-4H. As described above, the IDE supports both standard query languages such as JAVA as well as customized query languages such as HQL. In this example, referring to FIG. 6A, GUI 600 is configured to be a JAVA development environment. Note that for the purposes of consistency, certain reference numbers are maintained from FIGS. 4A-4H. Referring now to FIG. 6A, similar to GUI 400 of FIG. 4A, GUI 600 includes a project window 401, property window 404, a utility window 403, and an editing window 601 which is now configured to for editing JAVA compatible query strings.

Figure 6B:
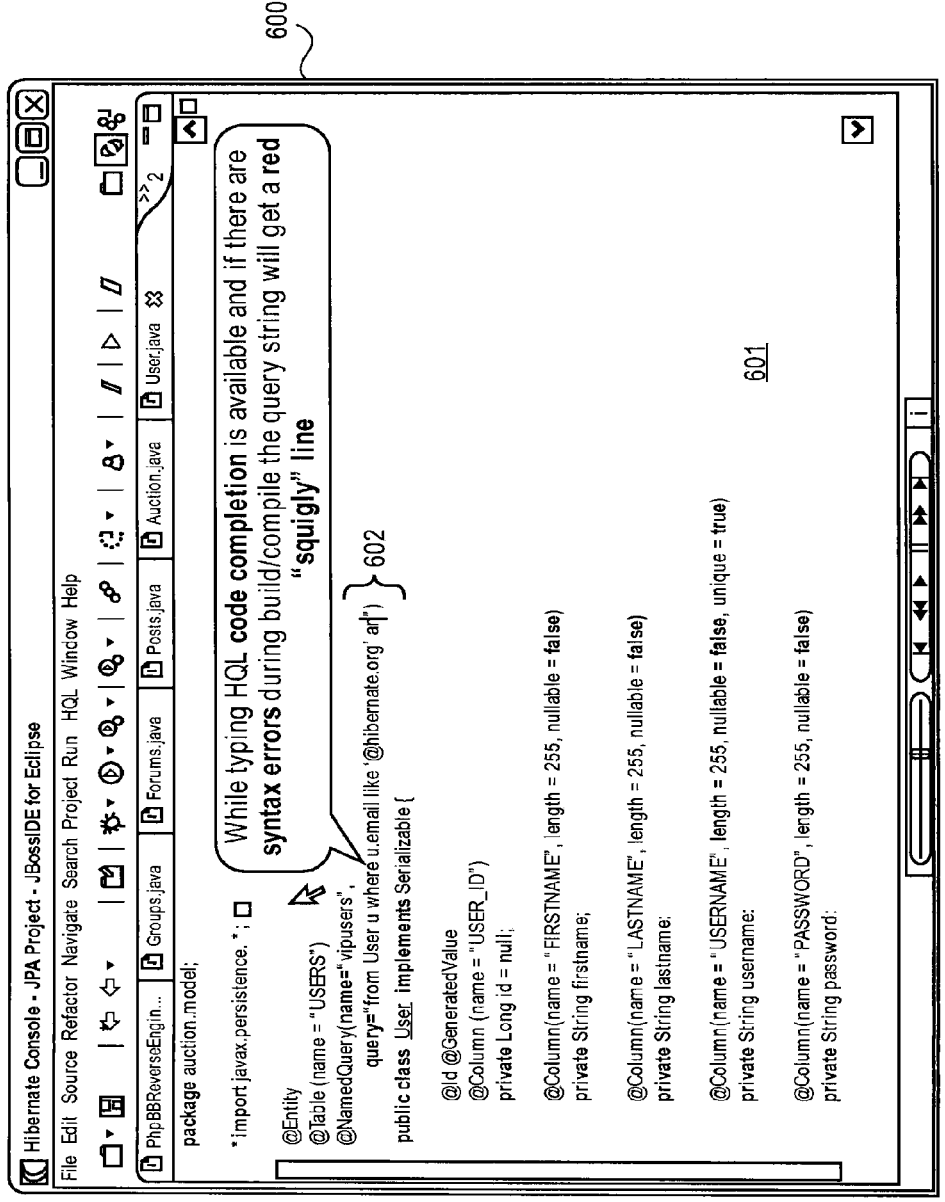
Figure 6C:
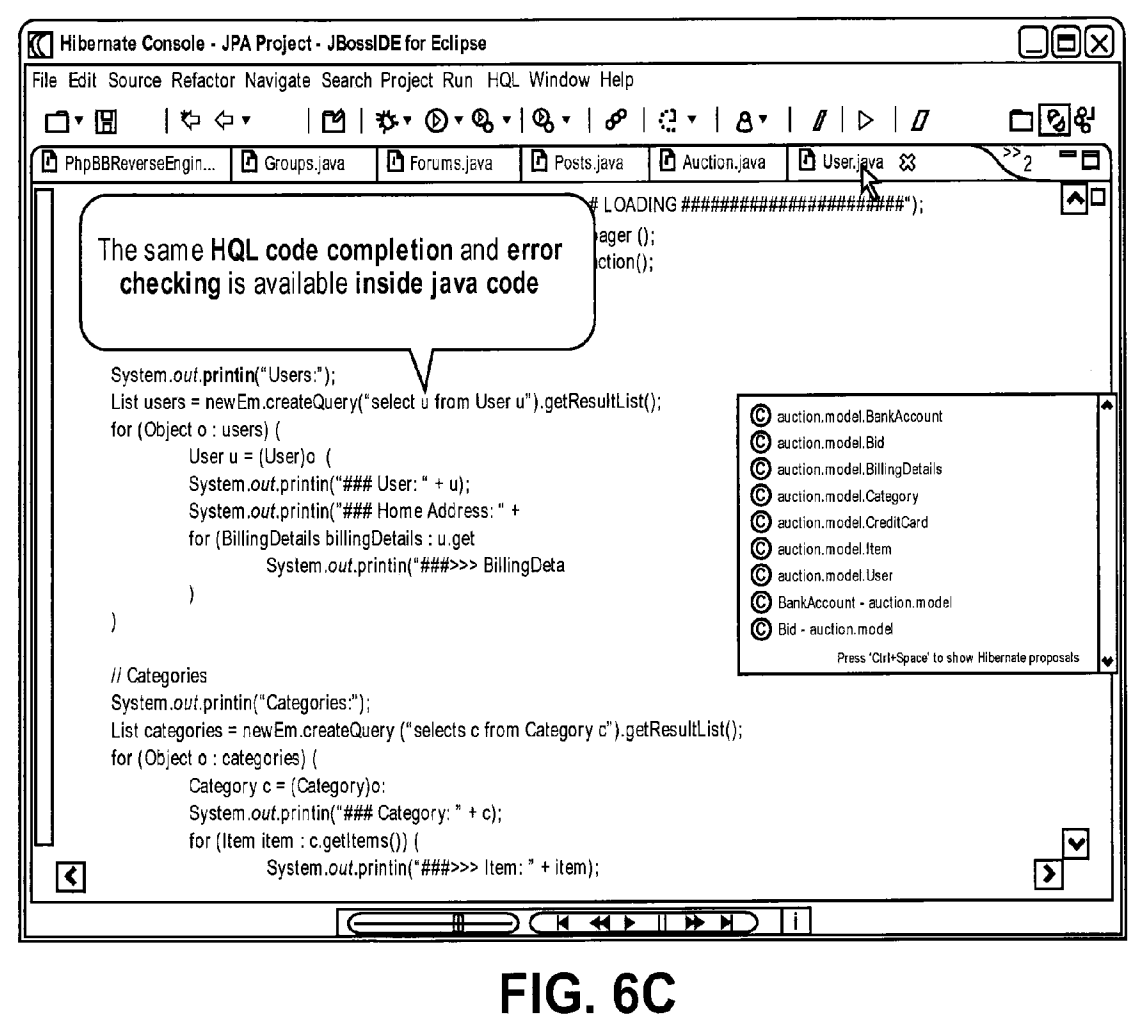
Figure 6D:
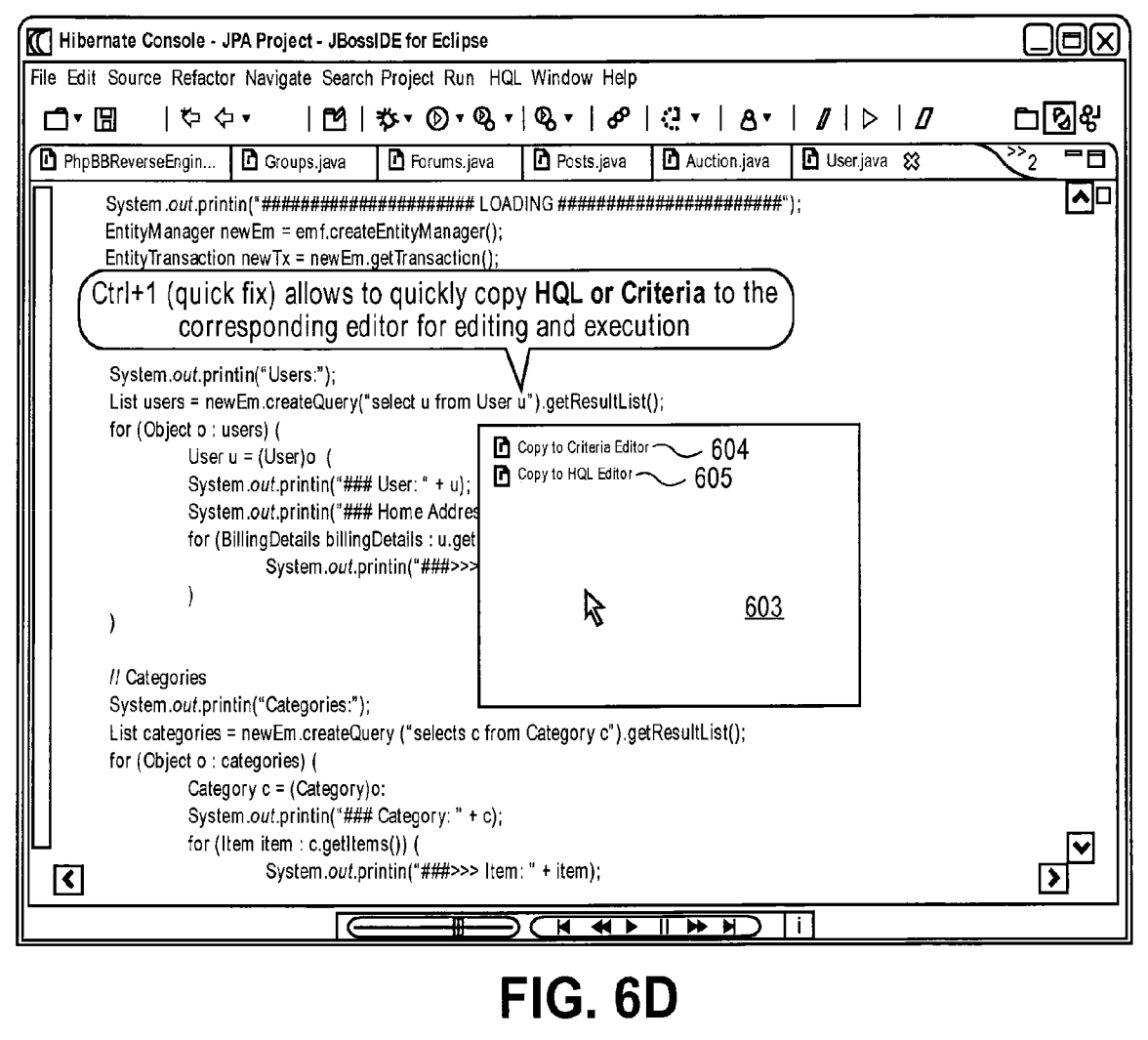

According to one embodiment, editing window 601 may also be used to edit other customized query strings such as HQL strings. As described above, the IDE includes JDT integration module (e.g., JDT integration module 304 of FIG. 3) to integrate customized editing functionality within a JAVA editor. Referring to FIG. 6B, when a customized query string 602, in this example, an HQL string, is entered in the JAVA editing window 601, error checking is concurrently performed and any error will be displayed in certain fashion (e.g., a red squiggly line) within window 601. As a result, as shown in FIG. 6C, the same HQL code completion and error checking is available inside JAVA code.

Figure 6E:
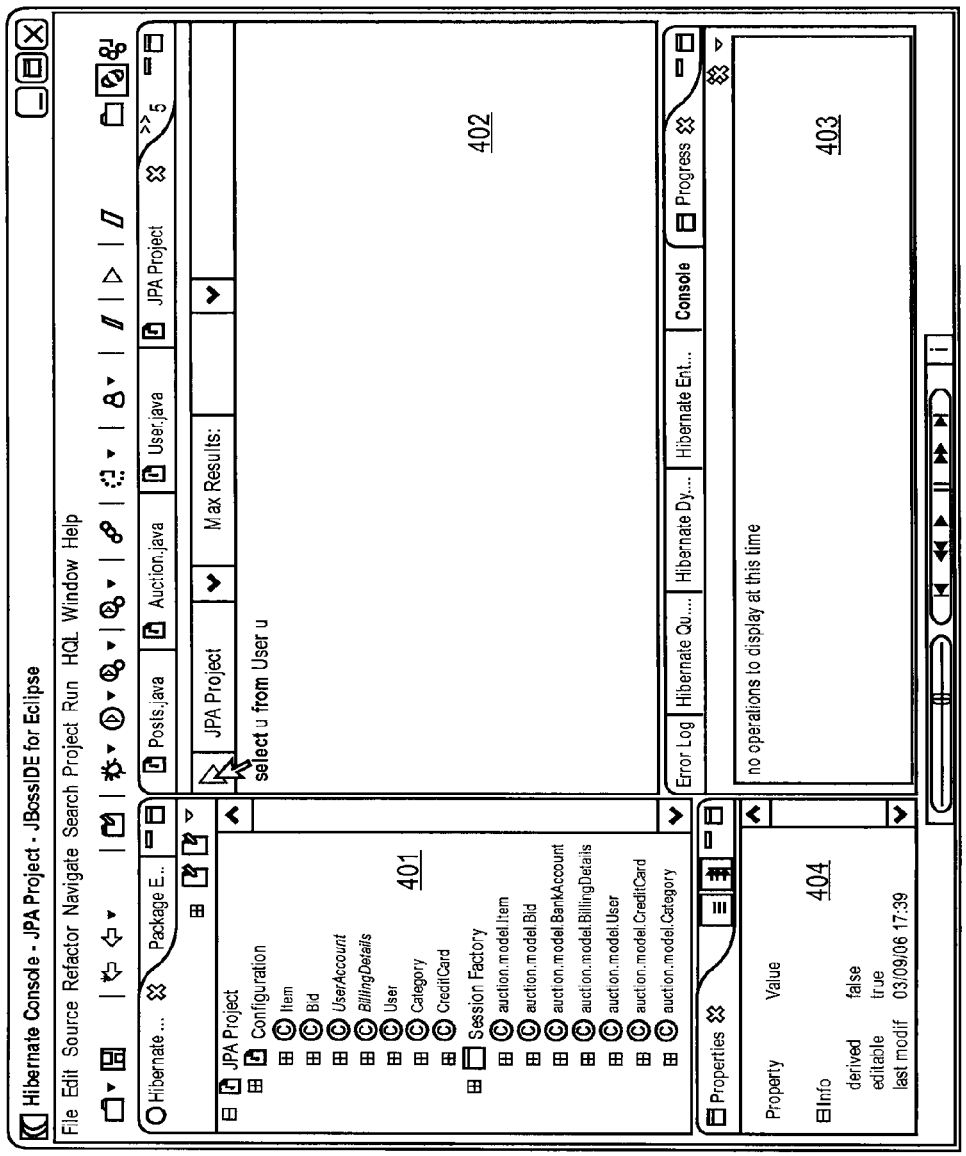
Figure 6F:
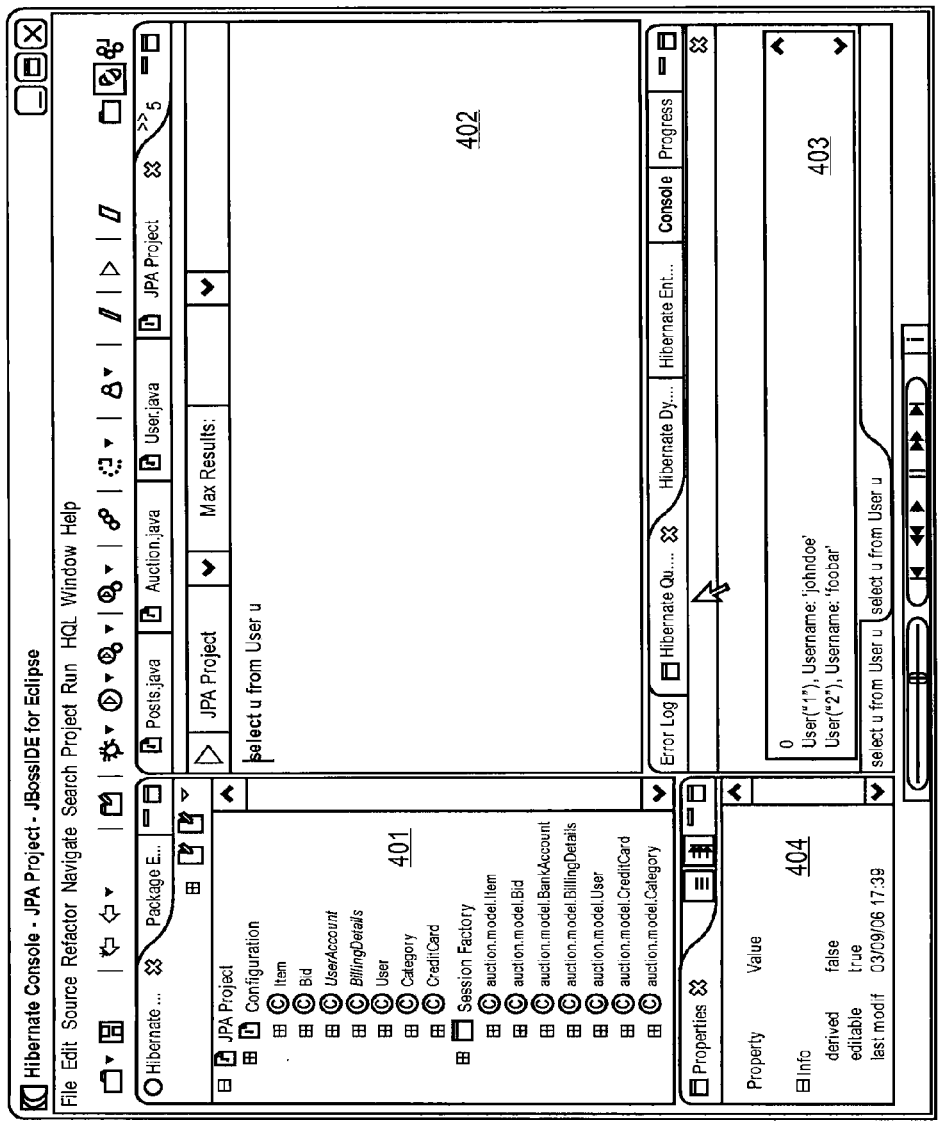
Figure 8A:
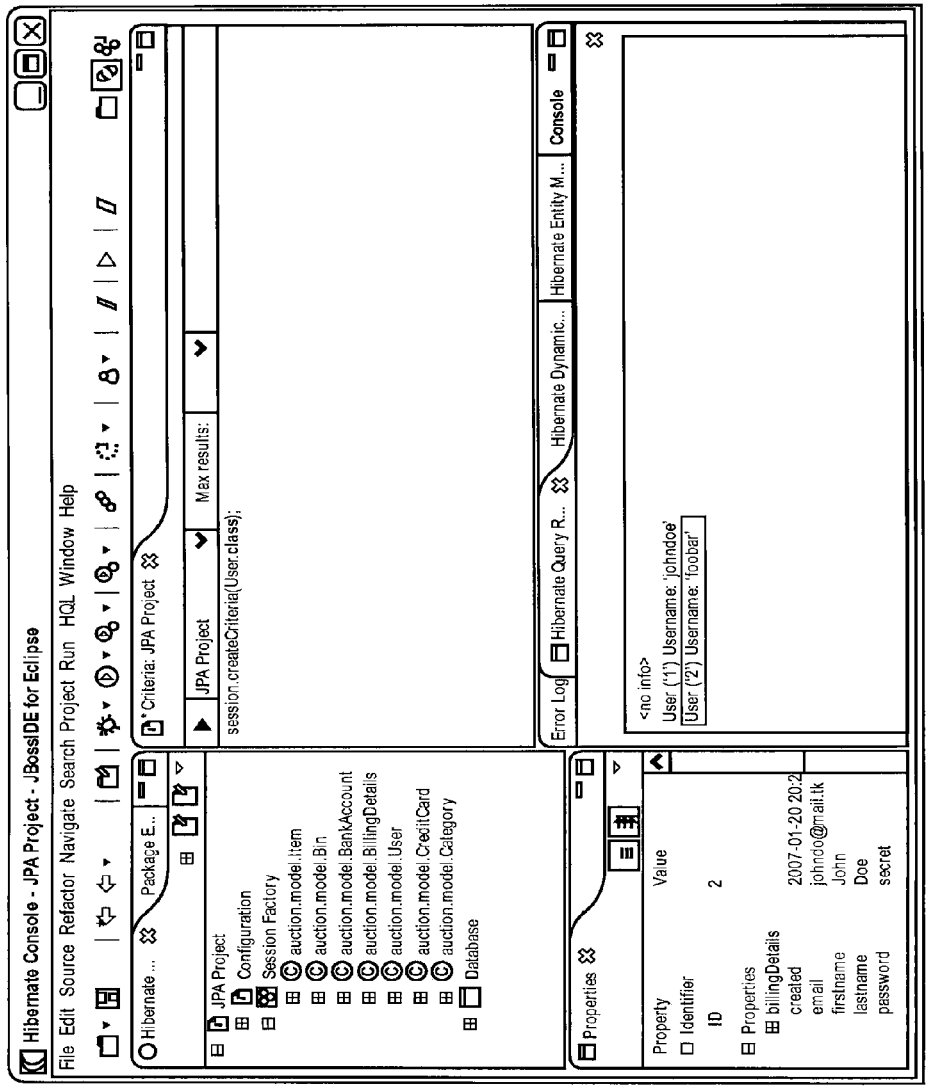
Figure 8B:
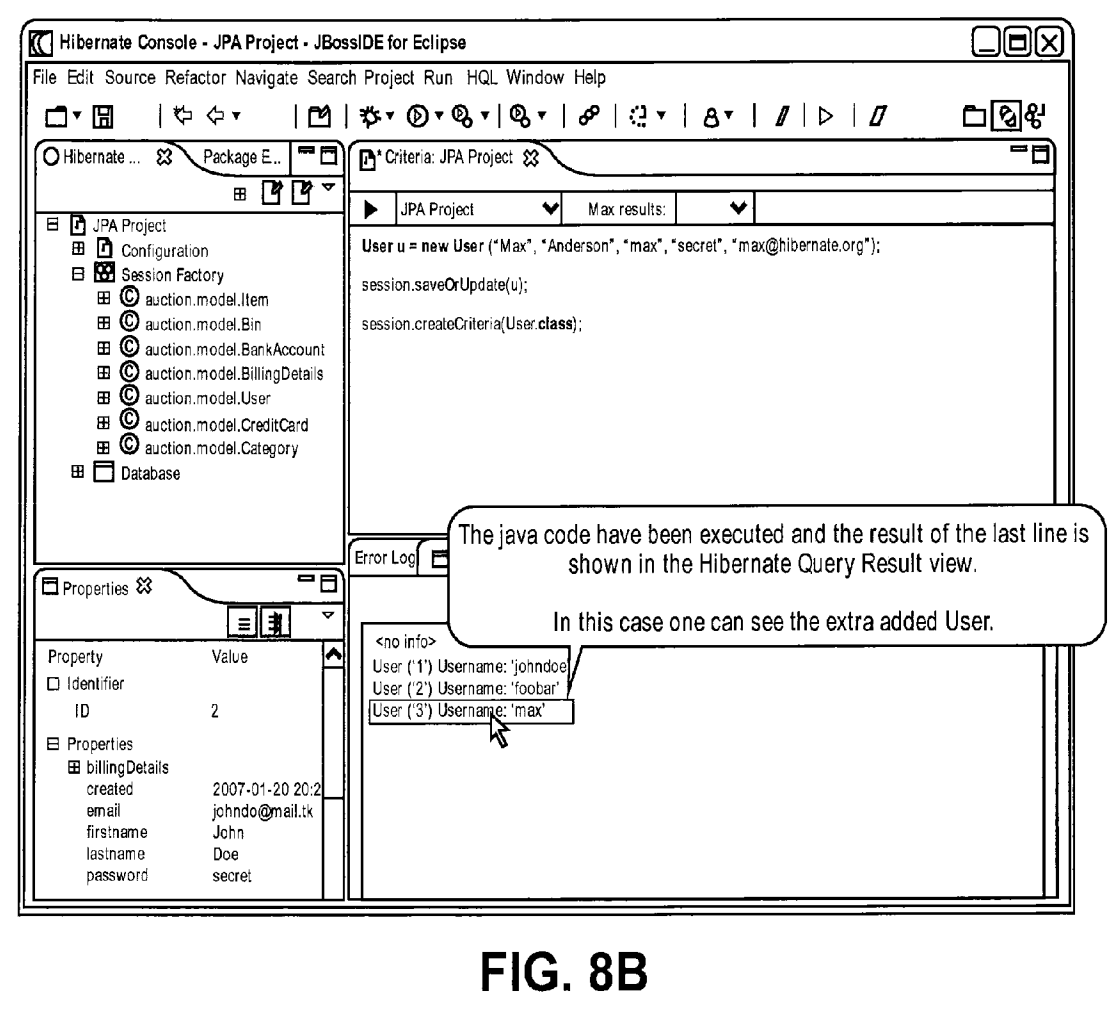

According to a further embodiment, a customized query string can be quickly replicated from the JAVA editor into a corresponding editor for editing and execution purposes. For example, referring to FIG. 6D, an HQL string "select u from User u" can be selected and replicated to an HQL editor (e.g., GUI 400 of FIGS. 4A-4H) or a criteria editor (e.g., GUI as shown in FIGS. 8A-8B) by activating a predetermined control or a key stroke. In this example, after selecting the string of "select u from User u", upon a key stroke of "Ctrl+1", a list of alternative editors is displayed in a pop-up window 603 including at least criteria editor 604 and HQL editor 605. A user can select one of those editors from window 603 to enable the selected string to be replicated to the selected editor. Assuming that the user selects the HQL editor 605 from window 603, the selected string will be replicated to the HQL editor as shown in FIG. 6E. Thereafter, the replicated string can be executed as shown in FIG. 6F and described above. Other configurations may also exist.

Figure 7:
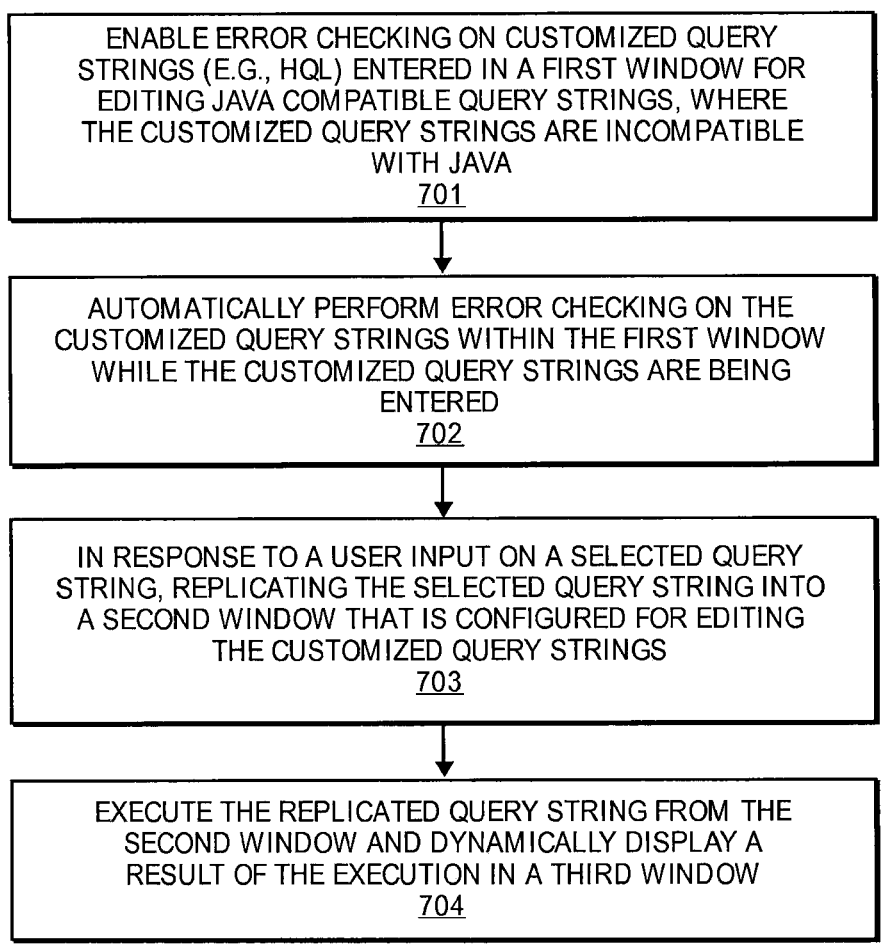
FIG. 7 is a flow diagram illustrating a process for developing database applications according to another embodiment of the invention.

FIG. 7 is a flow diagram illustrating a process for developing database applications according to another embodiment of the invention. Note that process 700 may be performed by processing logic which may include software, hardware, or a combination thereof. For example, process 700 may be performed by processing logic as shown in FIGS. 6A-6F. Referring to FIG. 7, at block 701, processing logic enables error checking on certain customized query strings (e.g., HQL strings) in a first window specifically designed for editing standard query strings (e.g., JAVA compatible strings), where the customized query strings are incompatible with the standard strings. At block 702, processing logic automatically performs error checking on the customized query strings within the first window while the customized query strings are being entered. In response to a user selection on a query string, at block 703, processing logic replicates the selected query string into a second window that is configured for editing the customized query strings. At block 704, the replicated strings are executed from the second window and a result is dynamically displayed in a third window. Other operations may also be performed.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
   performing error checking on a first query string to query an underlying database when receiving the first query string via a first querying-related window in a graphical user interface (GUI), wherein the first query string is written in a customized structured query language (SQL) and is incompatible with the underlying database;
   translating, by a processing device, the first query string from customized SQL to a second query string that is a SQL statement written in standard SQL, the second query string being compatible with the underlying database;
   displaying in a second querying-related window in the same GUI the second query string that is compatible with the underlying database, wherein executing the second query string queries the underlying database to create query results; and
   displaying in a third querying-related window in the same GUI a result of executing the second query string against the underlying database,
   wherein the first querying-related window, the second querying-related window, and the third querying-related window are displayed at a same time within a single instance of the same GUI comprising a plurality of querying-related windows.

2. The method of claim 1, wherein the second query string that is compatible with the underlying database is concurrently displayed in the second querying-related window in the GUI when receiving the first query string that is incompatible with the underlying database via the first querying-related window in the same GUI.

3. The method of claim 2, further comprising:
   indicating that an error is detected using a squiggly line with a different color in the first querying-related window.

4. The method of claim 1, further comprising:
   in response to an activation of a control associated with the first querying-related window in the GUI, executing the second query string against the underlying database.

5. The method of claim 4, further comprising:
   receiving a selection of a result item of the result displayed in the third querying-related window in the GUI; and
   in response to the selection, displaying in a fourth querying-related window in the same GUI one or more properties associated with the selected result item.

6. The method of claim 5, further comprising in response to an input from a user, displaying in a fifth querying-related window in the same GUI one or more parameters associated with the first query string.

7. The method of claim 6, wherein the first querying-related window, the second querying-related window, the third querying-related window, the fourth querying-related window, and the fifth querying-related window are displayed within a single instance of the same GUI comprising a plurality of querying-related windows.

8. A non-transitory machine-readable medium having instructions stored therein, which when executed by a processing device, cause the processing device to perform a method, the method comprising:
performing, by the processing device, error checking on a first query string to query an underlying database when receiving the first query string via a first querying-related window in a graphical user interface (GUI), wherein the first query string is written in a customized structured query language (SQL) and is incompatible with the underlying database;
translating, by the processing device, the first query string from customized SQL to a second query string that is a SQL statement written in standard SQL, the second query string being compatible with the underlying database;
displaying in a second querying-related window in the same GUI the second query string that is compatible with the underlying database, wherein executing the second query string queries the underlying database to create query results; and
displaying in a third querying-related window in the same GUI a result of executing the second query string against the underlying database,
wherein the first querying-related window, the second querying-related window, and the third querying-related window are displayed at a same time within a single instance of the same GUI comprising a plurality of querying-related windows.

9. The non-transitory medium of claim 8, wherein the second query string that is compatible with the underlying database is concurrently displayed in the second querying-related window in the GUI when receiving the first query string that is incompatible with the underlying database via the first querying-related window in the same GUI.

10. The non-transitory medium of claim 9, wherein the method further comprises:
indicating that an error is detected using a squiggly line with a different color in the first querying-related window.

11. The non-transitory medium of claim 8, wherein the method further comprises:
in response to an activation of a control associated with the first querying-related window in the GUI, executing the second query string against the underlying database.

12. The non-transitory medium of claim 11, wherein the method further comprises:
receiving a selection of a result item of the result displayed in the third querying-related window in the GUI; and
in response to the selection, displaying in a fourth querying-related window in the same GUI one or more properties associated with the selected result item.

13. The non-transitory medium of claim 12, wherein the method further comprises in response to an input from a user, displaying in a fifth querying-related window in the same GUI one or more parameters associated with the first query string.

14. The non-transitory medium of claim 13, wherein the first querying-related window, the second querying-related window, the third querying-related window, the fourth querying-related window, and the fifth querying-related window are displayed within a single instance of the same GUI comprising a plurality of querying-related windows.

15. A computer-implemented method, comprising:
receiving a selection of a query string via a first querying-related window in a graphical user interface (GUI) of an application, the first querying-related window for editing cross-platform programming language compatible query strings, wherein the selected query string is incompatible with a cross-platform programming language;
in response to receiving a selection of an editor, replicating, by a processing device, the selected query string into a second querying-related window for editing customized query strings using the selected editor and to enable a user to execute the customized query strings within the second querying-related window;
translating a first query string received via the first querying-related window to a second query string that is compatible with an underlying database;
displaying in a third querying-related window the second query string that is compatible with the underlying database; and
displaying in a fourth querying-related window a result of executing the second query string against the underlying database, wherein the first querying-related window, the second querying-related window, the third querying-related window and the fourth querying-related window are displayed at a same time within a single instance of the GUI, the GUI comprising a plurality of querying-related windows.

16. The method of claim 15, wherein the second querying-related window is part of a criteria editor.

17. The method of claim 15, further comprising:
performing error checking on the first query string when receiving the first query string via the second querying-related window in the GUI, wherein the first query string is incompatible with an underlying database and the first query string is an object-relational mapping (ORM) query language (OQL) statement to query the underlying database, and wherein the second query string is a structured query language (SQL) statement.

18. The method of claim 17, further comprising:
indicating that an error is detected using a squiggly line with a different color in the first querying-related window.

19. The method of claim 18, further comprising:
in response to an activation of a control associated with the second querying-related window in the GUI, executing the SQL statement against the underlying database.

20. The method of claim 19, further comprising:
receiving a selection of a result item of the result displayed in the fourth querying-related window in the GUI; and
in response to the selection, displaying in a fifth querying-related window in the same GUI one or more properties associated with the selected result item.

21. A system comprising:
a processing device; and
a memory coupled to the processing device and storing instructions that, when executed by the processing device, cause the processing device to:
perform error checking on a first query string to query an underlying database when receiving the first query string via a first querying-related window in a graphical user interface (GUI), wherein the first query string is written in a customized structured query language (SQL) and is incompatible with the underlying database,
translate the first query string from customized SQL to a second query string that is a SQL statement written in standard SQL, wherein the second query string is compatible with the underlying database,
display in a second querying-related window in the same GUI the second query string that is compatible with the underlying database, wherein executing the second query string queries the underlying database to create query results, and display in a third querying-related window in the same GUI a result of executing the second query string against the underlying database, wherein the first querying-related window, the second querying-related window, and the third querying-related window are displayed at a same time within a single instance of the same GUI comprising a plurality of querying-related windows.

22. The system of claim 21, wherein the second query string that is compatible with the underlying database is concurrently displayed in the second querying-related window in the GUI when receiving the first query string that is incompatible with the underlying database via the first querying-related window in the same GUI.

* * * * *